United States Patent [19]
Still

[11] Patent Number: 5,991,879
[45] Date of Patent: Nov. 23, 1999

[54] METHOD FOR GRADUAL DEPLOYMENT OF USER-ACCESS SECURITY WITHIN A DATA PROCESSING SYSTEM

[75] Inventor: Kelly W. Still, Phoenix, Ariz.

[73] Assignee: Bull HN Information Systems Inc., Billerica, Mass.

[21] Appl. No.: 08/956,539

[22] Filed: Oct. 23, 1997

[51] Int. Cl.$^6$ .................................................. G06F 11/00
[52] U.S. Cl. .......................................... 713/200; 710/240
[58] Field of Search .................................. 713/200, 201, 713/202, 100; 707/9; 709/229; 710/240, 241, 242, 243, 244; 380/23, 25

[56] References Cited

U.S. PATENT DOCUMENTS

| | | | |
|---|---|---|---|
| 5,111,504 | 5/1992 | Esserman et al. | 380/21 |
| 5,481,720 | 1/1996 | Loucks et al. | 713/201 |
| 5,696,898 | 12/1997 | Baker et al. | 713/201 |

*Primary Examiner*—Robert W. Beausoliel, Jr.
*Assistant Examiner*—Scott T. Baderman
*Attorney, Agent, or Firm*—J. S. Solakian; J. H. Phillips

[57] ABSTRACT

A method allowing the gradual deployment of a new security policy on a data processing system wherein users may access certain objects under the former authorization until complete security implementation is achieved. A user having a security profile satisfying the former security policy criteria, but not the new security criteria, would normally be denied access to objects that were formerly accessible. With the present invention, an intermediate security profile is created while the new policy is being implemented wherein such a user's access is not granted, but not necessarily denied. This tertiary state is achieved by supplementing the security profile of the user to satisfy the new security criteria. When a user attempts object access providing an identity token valid under the former system, arbitration occurs which may result in the synthesis or substitution of a proxy identity which is compliant with the new policy. Alternatively, the tertiary state is achieved by supplementing the security profile of the object. In such a case, when a user attempts object access providing an identity token valid under the former system, arbitration occurs resulting in the amendment of the object's access criteria to allow access under the former security criteria. The security administrator may be notified of the attempted use and subsequent security arbitration results.

7 Claims, 4 Drawing Sheets

METHOD FOR GRADUAL DEPLOYMENT OF USER-ACCESS SECURITY WITHIN A DATA PROCESSING SYSTEM

FIELD OF THE INVENTION

This invention relates generally to controlling access to objects and processes within a data processing system. More specifically it relates to a method for allowing the gradual deployment of a new security policy on a data processing system wherein individual users may, under predetermined conditions, continue to access certain objects and processes with the former authorization until complete implementation of the new security policy is achieved.

BACKGROUND OF THE INVENTION

Computer systems of all types, including networks, routers, switches, mainframes, personal computers, smart-cards or other data processing systems, often contain data or applications that are confidential or otherwise are subject to limited access. Access to these objects may be controlled through a security policy which prohibits access by a user, whether it be a person, a person within a defined group, another computer or other computer program, unless that subject has the proper authorization. That is, two states exist: either a request for access is granted or it is denied. Factors in a valid authorization include verifying the subject's identity and authorizing the right of access to given objects and/or processes. These factors are known in the art as verification and authorization, respectively, and may be unique to each subject.

Arbitration is the process of determining whether an authenticated subject has valid access to a given object. Arbitration is typically implemented on a compulsory basis requiring all users in a secure environment to be constrained by the same security policy in a non-refutable manner; access is either denied or granted.

It is sometimes desirable to implement a new security policy. The change may be made to implement a security policy where none existed before, to update an existing policy with more robust security criteria or to change existing criteria. If a system has a large number of subjects and objects, however, it may be difficult to implement a new security policy because each subject and object has its own unique security profile. Ensuring that security information for all subjects and objects have been updated to satisfy the new security criteria may not be practical. One factor is that the identity of all subjects may not be known. Or, it may be difficult to ascertain which users should have access to which objects. The result is that many users may be blocked from accessing previously-accessible objects when a new security policy is implemented all at once across a system. This severely and unacceptably limits use of the system until each user has been individually identified and then given access rights that satisfy the new security criteria.

It is desirable, then, to be able to implement a new security policy across an entire data processing system without inadvertently denying access to a number of valid users. This can be achieved by arbitrating access to a secured system in a new manner: a tertiary state (in addition to access-granted and access-denied) is created wherein the new security policy co-exists with the prior security policy. That is, a state is created in which access is not granted freely, but ultimately not necessarily denied. During the transition from old to new security policies, users having access rights satisfying the previous criteria may be allowed access until those rights can be updated to satisfy the criteria of the new policy. This eliminates the period during which valid users are denied service until their rights are modified to satisfy new criteria.

The arbitrated access may be an audited event, purely for notification or to ensure appropriate response by a security administrator or user. At no point is the security less restrictive than the prior policy, as the previous security policy remains in effect for all arbitrated activity that does not satisfy the criteria of the new policy.

OBJECTS OF THE INVENTION

It is therefore a broad object of this invention to provide a new method of arbitrating a user's access to a secured object.

Another object of this invention is to provide a method for gradually and methodically deploying a new security policy on a data processing system.

A further object of this invention is to provide a method of implementing a new security system policy without seriously affecting access to the system objects and processes by valid users under the prior security system.

In particular, it is an object of this invention to allow users having authorization under a former security policy to conditionally access, during a transition period, objects and processes within a data processing system for which a new security policy has been implemented.

SUMMARY OF THE INVENTION

The present invention is a method allowing the gradual deployment of a new security policy on a data processing system wherein users may access certain objects under the former authorization until complete security implementation is achieved.

A user having a security profile satisfying the former security policy criteria, but not the new security criteria, would be denied access to objects that were formerly accessible. With the present invention, an intermediate security profile is created while the new policy is being implemented wherein such a user's access is not granted, but not necessarily denied. This tertiary state is achieved by supplementing the security profile of the object. In such a case, when a user attempts object access providing an identity token valid under the former system, arbitration occurs resulting in the amendment of the object's access criteria to allow access under the former security criteria. The attempted use and subsequent security arbitration results may be an audited event, for notification or to ensure appropriate response by the security administrator or user. Alternatively, the tertiary state is achieved by supplementing the old security profiles of the user or application to satisfy the new security criteria. When a user attempts object access by providing an identity and token valid under the former system, arbitration occurs resulting in the synthesis or substitution by registration of a proxy identity which is compliant with the new policy.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE PREFERRED EMBODIMENTS

Figure 1:
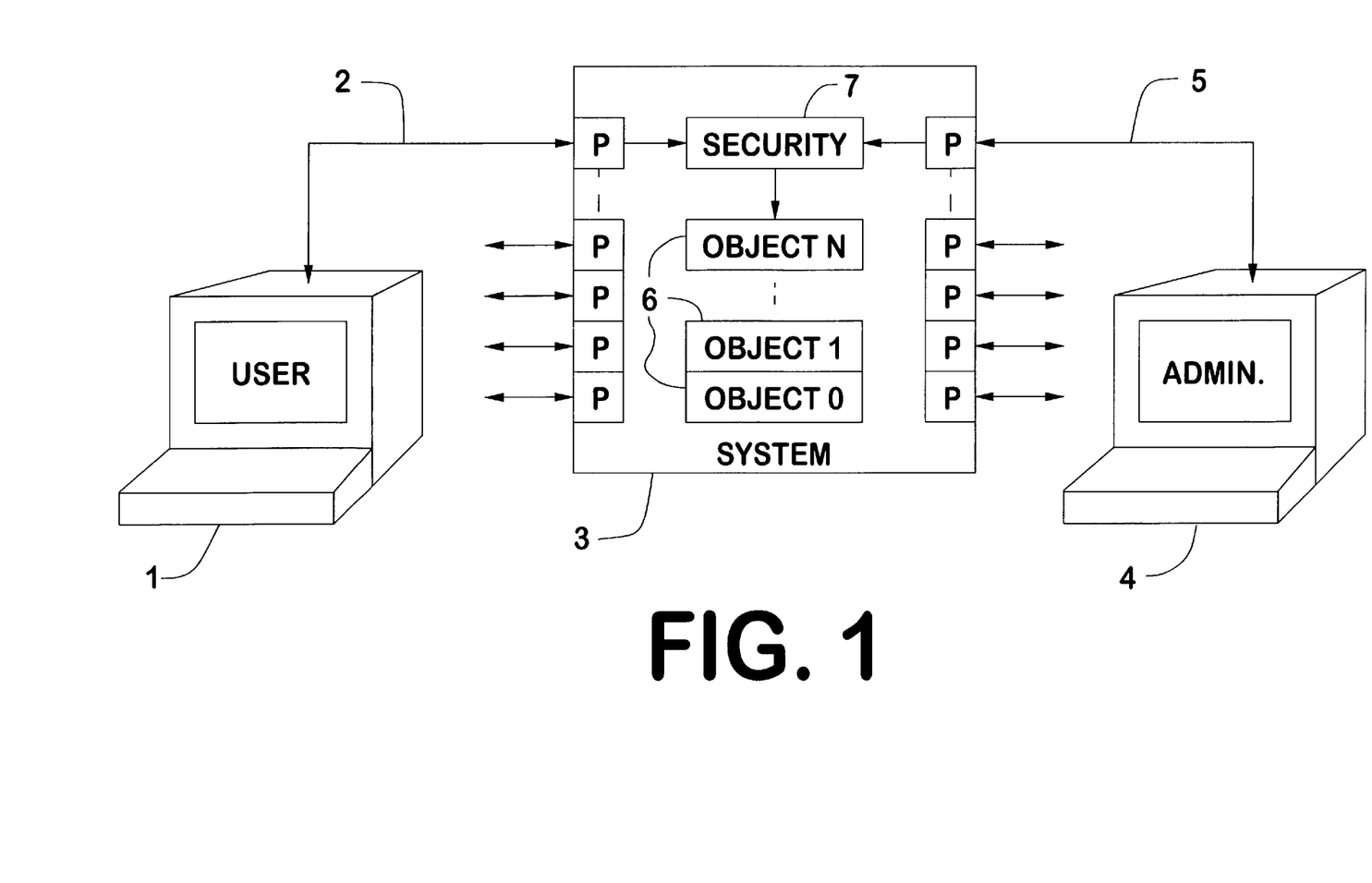
FIG. 1 is a general representation of an exemplary environment in which the invention may be practiced.

Attention is first directed to FIG. 1 which illustrates an exemplary environment in which the subject invention finds application. Thus, in the example, a user communicates from a workstation 1 with a system 3 via a communication path 2 and a port P in the system for the purpose of gaining access to and using one or more of the system objects 0-to-N 6. Access is granted or denied by a security process 7 which is under the control of a security administrator who communicates with the system 3 through another port P via communication path 5. As is well known in the art, the security administrator must supply a predetermined high level of identification and certification to the security process 7 before permission is granted for setting up and/or modifying the criteria in the security process which, on an individual basis, grants or denies permission for the user at the workstation 1 and additional users communicating into other ports P from corresponding additional workstations (not shown in FIG. 1).

As previously mentioned, access by a user to one or more objects in the system 3 typically relies upon the user supplying certain predetermined information such as a userid, a password and the identification of a process to which access is sought. However, when a new security system is installed (usually to increase the level of security), not only must each user be migrated to the new system, but each user, or group of users, must individually be reappraised according to new access criteria to determine if access to objects in the system will be granted to such individual user or group of users or even individual users in a group, all as established under the prior security system. In the past, this has involved a laborious and time consuming analysis of users (and user groups and individuals therein) and their individual permissions in the old system to determine their access and permissions, if any, in the new system.

The present invention treats and solves this problem by providing a temporary (as to each user or group of users) tertiary state ("not granted, but not necessarily denied") which permits the gradual transition from the prior security system to the new security system in a manner which admits the security administrator to effecting suitable judgments over a suitable transition period. As eligible users are transitioned to the new security system, the tertiary state is eliminated as to such eligible users and as to individual objects, and, eventually, the tertiary state is eliminated as to all users and objects, all under the discretionary control of the system administrator.

Consider now the aspect of the invention in which direct access to objects by requesting individual users (or groups of users or users in a defined group) may be handled during the transition period. In the example, under the prior system, a user was identified by a userid and a password, and this information is resident in the security database and accessible by the security administrator and by the tertiary state process. Typically, under the prior security system, a substantial number of users were assigned to a single group and employed the same userid and password for access to objects and processes granted to that group whereas, under the new, more robust security system, individual users are individually validated during the log on process.

Figure 2A:
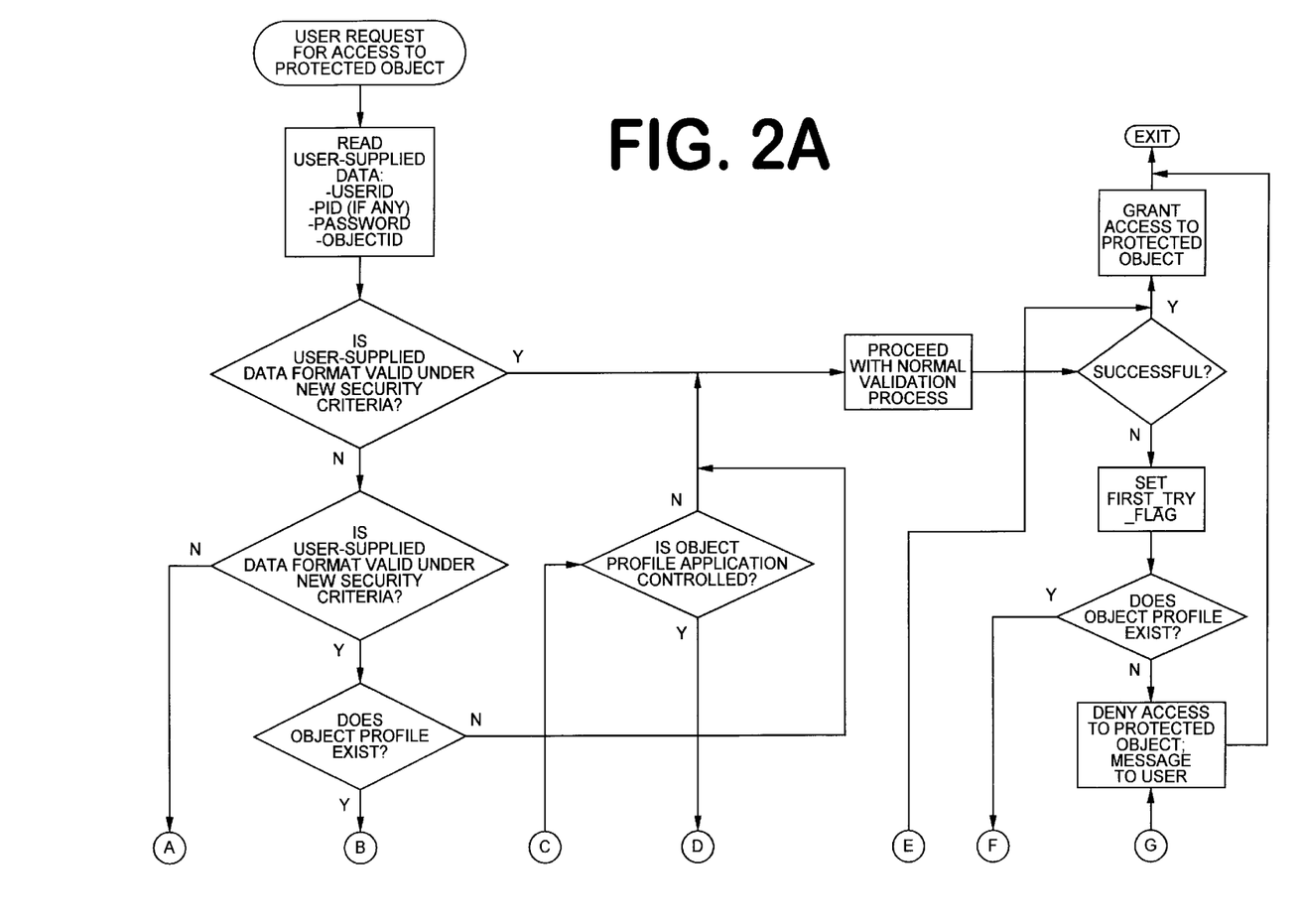
FIG. 2 is a flow diagram of a first embodiment of the invention as it may be employed to control access to a single object.
Figure 2B:
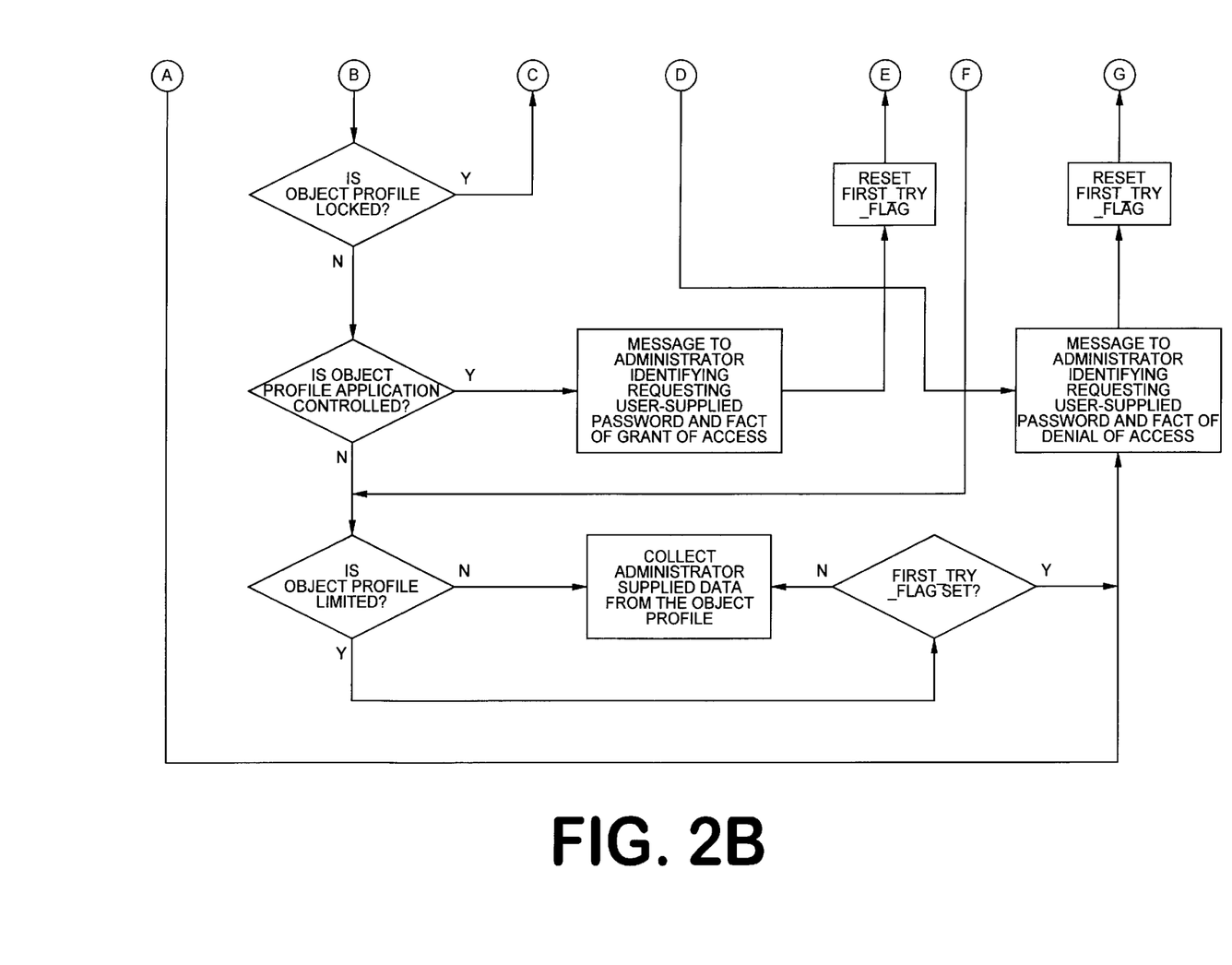

During the transition period, which, under the control of the security administrator, may be different or staggered for different individuals and/or groups of individuals and for different objects, the tertiary state process of FIG. 2 is followed as a temporary adjunct to processing requests for access to objects under the new security system. An individual user makes a request by entering either the necessary information under the previous security system (a userid, a password and the identification of the object/process to which access is sought) or under the new security system (in the example, a personal id or "PID", a password or other token and the identification of the object/process to which access is sought). If the user-supplied data is in a format valid under the new security system, the normal validation procedure under the new security system is carried out. If successful, the user is granted access to the protected object. If the validation procedure is unsuccessful, the First_Try_Flag is set, and in inquiry is made as to whether an object profile exists for the requested object. If an object profile does not exist, which means that access to the protected object is only available under the new security system, access is denied, and a message to that effect is sent to the user.

If an object profile does exist for the requested object, an inquiry is made to determine if the object profile is limited.; that is whether a requesting user must be successful on the first try for access. If the object profile is not limited, administrator supplied data from the object profile is collected, and a message is sent to the security administrator identifying the user and user-supplied information and the fact of grant of access by the tertiary state process, access to the object is granted and an exit made.

If the object profile is limited, a determination is made as to whether the First_Try_Flag is set. If the First_Try_Flag is set (as it will be in this instance), a message is sent to the security administrator identifying the requesting user-supplied password and the fact of denial of access, the First_Try_Flag is reset and access is denied with a message to that effect to the user. It will be observed that the effect of the test of the First_Try_Flag at this point is to deny access to the specified object by a user who has supplied a correctly formatted PID and password under the new security system, but was unsuccessful in logging on. Thus, the function of the object profile limited status is to force individual users who have already been supplied with a PID and password under the new security system to successfully log on via the new security system on the first try. The information supplied to the security administrator may indicate that this user needs individual attention to become proficient in logging on under the new security system.

If the user-supplied data is not in a format valid under the new security criteria as predetermined by the security administrator, the process flow is redirected. A determination is made as to whether the user supplied data format is valid under the prior security criteria. If not, a message is sent to the security administrator identifying the requesting user-supplied password and the fact of denial of access, the First_Try_Flag is reset, access to the protected object is denied and a message to that effect is sent to the user attempting to log on. This user may need individual assistance from the security administrator or may even be spurious.

If the user-supplied data format is valid under the prior security system, the tertiary state per se is directly entered.

A determination is first made as to whether an object profile exits for the requested object. That is, is assisted log on under the tertiary process allowed at all (as predetermined by the security administrator) for the object or process identified in the user-supplied data? If not, normal validation under the new security system is tried, and the process flow discussed above follows. It will be seen that the user request will be repeatedly denied, and the user will have to make inquiry to the security administrator to determine if access to the given object should be granted. To permit access to the requested object under the prior security system requires the intervention of the security administrator to create an object profile for the requested object; in the meantime, the tertiary state process will not grant access. Of course, it may only be necessary for the security administrator, if appropriate, to provide to the individual user a valid PID and password under the new security system and/or assist the user to achieve proficiency under the new security system.

If an object profile exists for the requested object, a determination is made as to whether the object profile is locked. That is, as to the requested object, has the security administrator determined that a sufficient time period has passed since the invocation of the new security system such that no valid user should still be attempting access under the prior security system? If the security administrator has made that decision, the profile for the identified object is locked and assisted access under the tertiary process is no longer available.

If the object profile is locked, a determination is made as to whether the object profile is application controlled. That is, does the object to which access is sought itself have internal security which will further scrutinize the requesting user? If the object profile is not application controlled, the normal validation process under the new security system is carried out to, in effect, force a denial of access since the user cannot be successful under the supplied data, and access will be repeatedly denied. If the object profile is application controlled, a message is sent to the administrator identifying the user and user supplied information and the fact of denial of access by the tertiary state process. The First_Try_Flag is reset, access is denied and exit made. Thus, the security administrator is provided with information that one or more users trying to access a now-locked object may need individual assistance as noted above or may need to be definitively notified that access to that object will no longer be granted to that user.

If the object profile is not locked, a separate determination is made as to whether the object profile is application controlled. If the object profile is application controlled, the tertiary process will relinquish responsibility for granting or denying access to the object itself by sending a message to the security administrator identifying the requesting user-supplied password and the fact of grant of access to the object, resetting the First_Try_Flag, granting access to the object and exiting.

If the object profile is not application controlled, a determination is made as to whether the object profile is limited; that is whether a requesting user must be successful on the first try for access. If the object profile is not limited, administrator supplied data from the object profile is collected, and a message is sent to the security administrator identifying the user and user-supplied information and the fact of grant of access by the tertiary state process, access to the object is granted and an exit made.

If the object is profile limited, a determination is made as to whether the First_Try_Flag is set. If the First_Try_Flag is set, a message is sent to the security administrator identifying the requesting user-supplied password and the fact of denial of access, the First_Try_Flag is reset, and access is denied with a message to that effect to the user. As previously noted, the effect of the test of the First_Try_Flag at this point is to deny access to the specified object by a user who has supplied a correctly formated PID and password under the new security system, but was unsuccessful in logging on. Again, the function of the object profile limited status is to force individual users who have already been supplied with a PID and password under the new security system to successfully log on to access this particular via the new security system on the first try. The information supplied to the security administrator may indicate that this user needs individual attention to become proficient in logging on under the new security system.

It will now be appreciated how a new security system can be systematically gradually deployed, object-by-object, while permitting controlled ongoing log on by users under the prior security system. Under the security administrator's control and subject to change by the security administrator, an object may or may not have a profile. At the beginning of a transition period, a profile for a given object is created unless it is desired that access to the object is to immediately be available only under the new security system. At the beginning of the transition period as to the given object, the object profile typically would not be locked. The object profile may or may not be application controlled because that characteristic is inherent to the object. The object profile may or may not be limited, and this determination typically depends upon the sensitivity of the object. However, as a transition period for a given object proceeds, the security administrator has the authority and information (from the collection of messages which have been received) to change an object profile from not limited to limited. Similarly, at the effective end of the transition period for the given object, the security administrator has the authority and information (from the collection of messages which have been received) to change an object profile from not locked to locked. Further, subsequent denials of access because a process is locked and application controlled will result in a message to the administrator that a valid user of the object under the prior security system who should have access under the new security system may need special attention to become validated and/or proficient under the new security system.

Figure 3:
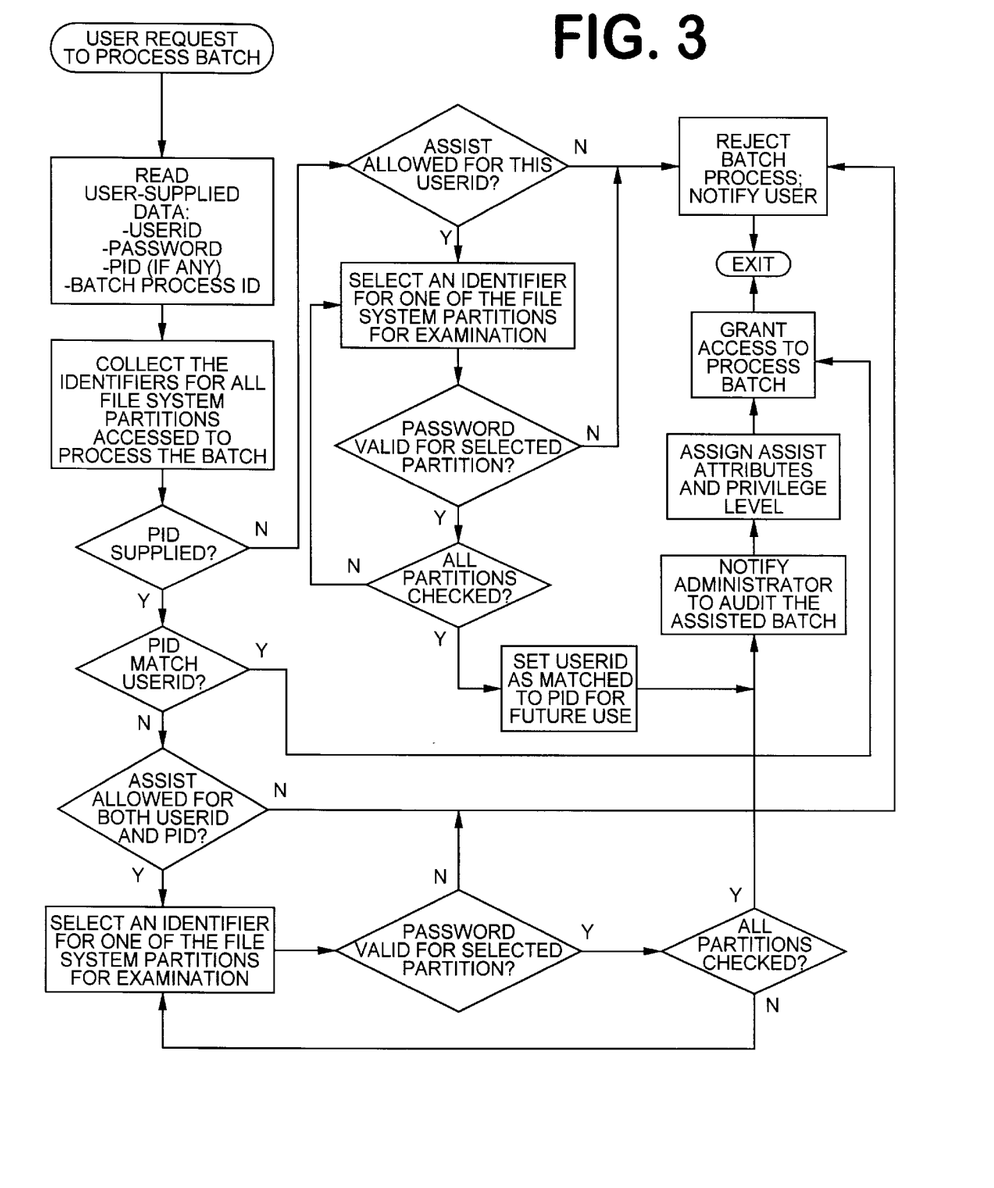
FIG. 3 is a flow diagram of a second embodiment of the invention as it may be employed to control access to a batch process.

The tertiary state process also handles requests for batch processing. Referring to FIG. 3, a user (who may or may not have already logged on through the process shown in FIG. 2) makes a request for batch processing by entering either the necessary information under the previous security system (a userid, a password and the identification of the batch process to which access is sought) or under the new security system (in the example, a personal id or "PID", a password or other token and the identification of the batch process to which access is sought). The system collects the identification for all file system partitions required to process the batch and then an inquiry is made to determine if a new security system PID has been supplied. If not (i.e., a userid has been supplied), an inquiry is made to determine if assist under the tertiary state process is allowed (as predetermined by the security administrator) for the supplied userid. (As previously mentioned, a number of users, even many users, may have employed a given userid under the prior security system.) If assist is not allowed for the userid under examination, the batch process request is denied, and the user is notified accordingly.

However, if the security administrator has predetermined that assist will be allowed for the userid under examination, an identifier for one of the file system partitions required to handle the batch process is selected, and the password supplied by the user is checked to determine if it is valid for the selected partition, again as predetermined by the security administrator. If the password is not valid, the batch process request is denied, and the requesting user is notified accordingly. If the password is valid for the selected file system partition, a detemination is made as to whether all the pertinent partitions have been checked. If not another partition identifier is selected and its supplied password is checked. (Typically, but not universally, a different password is required for obtaining access to each partition.) If all the partitions have been checked and the supplied password(s) have been determined to be valid for each of them, then the supplied userid is set as registered to the user PID for future runs of the same batch, the security administrator is notified to audit the assisted batch for reassurance that such future use is suitable for the requesting user, assist attributes and privilege levels are assigned to the userid as appropriate, and access to the batch process is granted.

If a PID is supplied and it is registered to the userid because of the action discussed above during a previous processing of the userid through the tertiary state process, access to the batch process is granted without further examination. However, if the userid is not registered to the PID, a determination is made as to whether assist is allowed for both the supplied PID and the supplied userid. If not, the request for batch processing is denied, and the user is notified. If assist is allowed for both the supplied PID and the supplied userid, an identifier for one of the file system partitions required to handle the batch process is selected, and the password supplied by the user is checked to determine if it is valid for the selected partition, again as predetermined by the administrator. If the password is not valid, the batch process request is denied, and the user is notified accordingly. If the password is valid for the selected file system partition, a determination is made as to whether all the pertinent partitions have been checked. If not, another partition identifier is selected and the supplied password again checked. If all the partitions have been checked and the supplied password(s) have been determined to be valid for each of them, then the administrator is notified to audit the assisted batch for reassurance that such future use is suitable for the requesting user, assist attributes and privilege levels are assigned to the requesting userid as appropriate, and access to the batch process is granted.

The security administrator can selectively change the assist status of various users or groups of users over a period of time to provide individually tailored grace periods during which a requesting user will be considered by the tertiary state process for ongoing access to objects/processes. After a suitable period for a given user or group of users, the administrator can invoke the full effect of the new security system such that, even if a user has previously been eligible for assist, such assist is no longer undertaken. However, in accordance with one feature of the invention, a user or group of users may be automatically transitioned to the new security system without further intervention on their part.

In the case of batch processing, the security administrator can further exercise control over the transition process by selectively preventing the registration of a userid to a PID, both as to individual userid's and after a period of time as to all or a group of userid's. Further control can be selectively implemented by setting whether assist is allowed at all for a given userid or set of userid's and as to whether assist is allowed for a registered userid and PID pair, and these decisions can be made as to individual users and objects/processes at any time during the transition process.

Accordingly, the present invention allows a more robust security policy to be installed and activated in a gradual manner by supporting those users that satisfy the new security criteria and allowing continued support for those users that fail to satisfy the new criteria, but who can be successfully validated under the previous security criteria according to conditions predetermined by the security administrator. This invention allows transition to a new security policy by automatically supplementing the information supplied by users during system access with the information necessary for successful validation in the new environment The method can also be applied in implementing a security policy where none existed before, or to change existing criteria, more robust or not. It may also be applied in situations where it is desirable to implement a policy change over time.

Thus, while the principles of the invention have now been made clear in an illustrative embodiment, there will be immediately obvious to those skilled in the art many modifications of structure, arrangements, proportions, the elements, materials and components used in the practice of the invention which are particularly adapted for specific environments and operating requirements without departing from those principles.

What is claimed is:

1. A process for arbitrating an attempted access to a data processing system in which a new security system incorporating a normal validation process has been invoked, which new security system requires the submission by a requesting user of at least an identification of the requesting user, a token and an identification of the data processing system objects to which access is sought, the process comprising steps A), B), B)1), B)2), C), C)1), C)2), D), D)1), D)2), E), E)1), E)2), F), F)1), F)2), G), G)1), G)2), H), H)1), H)2), Y) and Z), which steps respectively perform the following operations when invoked:

A) receives a user's request in a user-supplied data format to access a requested object in the data processing system;

B) determines if the user-supplied data format is valid under the new security system;

1) if the user-supplied data format is valid under the new security system, directs process flow to step C);

2) if the user-supplied data format is not valid under the new security system, directs process flow to step D);

C) performs the normal validation process under the new security system;

1) if the normal validation process is successful, directs process flow to step Y);

2) if the normal validation process is unsuccessful, directs process flow to step Z);

D) determines if an object profile exists in the new security system for the requested object;

1) if an object profile does not exist for the requested object, directs process flow to step C);

2) if an object profile exists for the requested object, directs process flow to step E);

E) determines if the profile of the requested object is locked;

1) if the profile of the requested object is locked, directs process flow to step F);

2) if the profile of the requested object is not locked, directs process flow to step G);

F) determines if the object profile is application controlled;

1) if the object profile is application controlled; directs process flow to step Z);

2) if the object profile is not application controlled; directs process flow to step C);

G) determines if the object profile is application controlled;
   1) if the object profile is application controlled; directs process flow to step Y);
   2) if the object profile is not application controlled; directs process flow to step H);

H) determines if the object profile is limited;
   1) if the object profile is limited; directs process flow to step Z);
   2) if the object profile is not limited, directs process flow to step Y);

Y) grants to the requesting user access to the requested object and exits the process;

Z) denies access to the requested object and exits the process.

2. A process for arbitrating an attempted access to a data processing system in which a new security system incorporating a normal validation process has been invoked as a successor to a prior security system, which new security system requires the submission by a requesting user of at least an identification of the requesting user, a token and an identification of the data processing system objects to which access is sought, in which, a security administrator predetermines and has the authority to adjust the degree of access to objects in the data processing system under the new security system to users supplying identification of the requesting user, a token and an identification of the data processing system objects to which access is sought which were valid under the prior security system, the process comprising steps A), B), B)1), B)2), C), C)1), C)2), D), D)1), D)2), E), E)1), E)2), F), F)1)a), F)1)b), F)2), G), G)1), G)2), H), H)1)a), H)1)b), H)2)a), H)2)b), X), Y) and Z), which steps respectively perform the following operations when invoked:

A) receives a user's request in a user-supplied data format to access a requested object in the data processing system;

B) determines if the user-supplied data format is valid under the new security system;
   1) if the user-supplied data format is valid under the new security system, directs process flow to step C);
   2) if the user-supplied data format is not valid under the new security system, directs process flow to step D);

C) performs the normal validation process under the new security system;
   1) if the normal validation process is successful, directs process flow to step Y);
   2) if the normal validation process is unsuccessful, directs process flow to step H);

D) determines if an object profile exists in the new security system for the requested object;
   1) if an object profile does not exist for the requested object, directs process flow to step C);
   2) if an object profile exists for the requested object, directs process flow to step E);

E) determines if the profile of the requested object is locked;
   1) if the profile of the requested object is locked, directs process flow to step F);
   2) if the profile of the requested object is not locked, directs process flow to step G);

F) determines if the object profile is application controlled;
   1) if the object profile is application controlled:
      a) sends a message to the security administrator identifying the requesting user-supplied token and the fact of denial of access; and
      b) directs process flow to step Z);
   2) if the object profile is not application controlled; directs process flow to step C);

G) determines if the object profile is application controlled;
   1) if the object profile is application controlled; directs process flow to step X);
   2) if the object profile is not application controlled; directs process flow to step H);

H) determines if an object profile is limited;
   1) if the object profile is limited:
      a) sends a message to the security administrator identifying the requesting user-supplied token and the fact of denial of access; and
      b) directs process flow to step Z);
   2) if the object profile is not limited:
      a) collects administrator supplied data for the object profile; and
      b) directs process flow to step Y);

X) sends a message to the security administrator identifying the requesting user-supplied token and the fact of grant of access to the requested object to the requesting user;

Y) grants to the requesting user access to the requested object and exits the process;

Z) denies access to the requested object, notifying the requesting user of that fact and exits the process.

3. The process of claim 2 which further includes steps AA), BB), BB)1), BB)2), CC), CC)1), CC)2), DD), DD)1), DD)2), EE), EE)1), EE)2), FF), FF)1), FF)2), GG), GG)1), GG)2), HH), HH)1), HH)2), YY) and ZZ), carried out prior to the performance of step A), which steps respectively perform the following operations when invoked:

AA) receives a user's request in a user-supplied data format to access a requested object in the data processing system;

BB) determines if the user-supplied data format is valid under the new security system;
   1) if the user-supplied data format is valid under the new security system, directs process flow to step CC);
   2) if the user-supplied data format is not valid under the new security system, directs process flow to step DD);

CC) performs the normal validation process under the new security system;
   1) if the validation process is successful, directs process flow to step YY);
   2) if the normal validation process is unsuccessful, directs process flow to step ZZ);

DD) determines if an object profile exists in the new security system for the requested object;
   1) if an object profile does not exist for the requested object, directs process flow to step CC);
   2) if an object profile exists for the requested object, directs process flow to step EE);

EE) determines if the profile of the requested object is locked;
   1) if the profile of the requested object is locked, directs process flow to step FF);
   2) if the profile of the requested object is not locked, directs process flow to step GG);

FF) determines if the object profile is application controlled;
   1) if the object profile is application controlled; directs process flow to step ZZ);
   2) if the object profile is not application controlled; directs process flow to step CC);
GG) determines if the object profile is application controlled;
   1) if the object profile is application controlled; directs process flow to step YY);
   2) if the object profile is not application controlled; directs process flow to step HH);
HH) determines if the object profile is limited;
   1) if the object profile is limited; directs process flow to step ZZ);
   2) if the object profile is not limited, directs process flow to step YY);
YY) grants to the requesting user access to the requested object and exits the process;
ZZ) denies access to the requested object and exits the process.

4. A process for arbitrating an attempted access to a data processing system in which a new security system incorporating a normal validation process has been invoked for the purpose of processing a batch, which new security system requires the submission by a requesting user of at least a user-supplied PID identifying the requesting user, a token and an identification of the batch process to which access is sought, the process comprising steps A), B), B)1), B)2), C), C)1), C)2), D), E), E)1), E)2), F), F)1), F)2), G), H), I), I)1), I)2), J), J)1), J)2), K), L), L)1), L)2), M), M)1), M)2), Y) and Z), which steps respectively perform the following operations when invoked:
   A) collects the identifiers for all file system partitions which must be accessed to process the specified batch;
   B) determines if the user-supplied PID is valid under the new security system;
      1) if the PID is valid under the new security system, directs process flow to step I);
      2) if the PID is not valid under the new security system, directs process flow to step C);
   C) determines if assist is temporarily allowed for a user identification which may have been supplied by the requesting user;
      1) if assist is allowed, directs process flow to step D);
      2) if assist is not allowed, directs process flow to step Z);
   D) selects an identifier for one of the file system partitions for examination;
   E) determines if the user supplied token is valid for the selected partition;
      1) if the user supplied token is valid for the selected partition, directs process flow to step F);
      2) if the user supplied token is not valid for the selected partition, directs process flow to step Z);
   F) determines if all partitions required to execute the specified batch have been examined;
      1) if all partitions required to execute the specified batch have been examined, directs process flow to step G);
      2) if all partitions required to execute the specified batch have not been examined, selects a different identifier and directs process flow back to step E);
   G) sets the user supplied identification as registered to a PID assigned to the user for future runs of the same batch process;
   H) assigns assist attributes and privilege level to the user and directs process flow to step Y);
   I) determines if the user identification has been registered to the supplied PID;
      1) if the user identification has been registered to the supplied PID, directs process flow to step Y);
      2) if the user identification has not been registered to the supplied PID, directs process flow to step J);
   J) determines if assist is allowed for both the user identification and the PID;
      1) if assist is allowed for both the user identification and the PID, directs process flow to step K);
      2) if assist is not allowed for both the user identification and the PID, directs process flow to step Z);
   K) selects an identifier for one of the file system partitions for examination;
   L) determines if the user supplied token is valid for the selected partition;
      1) if the user supplied token is valid for the selected partition, directs process flow to step M);
      2) if the user supplied token is not valid for the selected partition, directs process flow to step Z);
   M) determines if all partitions required to execute the specified batch have been examined;
      1) if all partitions required to execute the specified batch have been examined, directs process flow to step Y);
      2) if all partitions required to execute the specified batch have not been examined, selects a different identifier and directs process flow back to step L);
   Y) grants to the requesting user access to the requested batch process and exits the process;
   Z) denies access to the requested batch process, notifying the requesting user of that fact and exits the process.

5. The process of claim 4 in which an administrator is notified to audit the assisted batch access in conjunction with the performance of steps G) and M)1).

6. The process of claim 3 which further includes steps AA), BB), BB)1), BB)2), CC), CC)1), CC)2), DD), DD)1), DD)2), EE), EE)1), EE)2), FF), FF)1), FF)2), GG), GG)1), GG)2), HH), HH)1), HH)2), YY) and ZZ), carried out prior to the performance of step A), which steps respectively perform the following operations when invoked:
   AA) receives a user's request in a user-supplied data format to access a requested object in the data processing system;
   BB) determines if the user-supplied data format is valid under the new security system;
      1) if the user-supplied data format is valid under the new security system, directs process flow to step CC);
      2) if the user-supplied data format is not valid under the new security system, directs process flow to step DD);
   CC) performs the normal validation process under the new security system;
      1) if the validation process is successful, directs process flow to step YY);
      2) if the normal validation process is unsuccessful, directs process flow to step ZZ);
   DD) determines if an object profile exists in the new security system for the requested object;
      1) if an object profile does not exist for the requested object, directs process flow to step CC);
      2) if an object profile exists for the requested object, directs process flow to step EE);

EE) determines if the profile of the requested object is locked;
  1) if the profile of the requested object is locked, directs process flow to step FF);
  2) if the profile of the requested object is not locked, directs process flow to step GG);
FF) determines if the object profile is application controlled;
  1) if the object profile is application controlled; directs process flow to step ZZ);
  2) if the object profile is not application controlled; directs process flow to step CC);
GG) determines if the object profile is application controlled;
  1) if the object profile is application controlled; directs process flow to step YY);
  2) if the object profile is not application controlled; directs process flow to step HH);
HH) determines if the object profile is limited;
  1) if the object profile is limited; directs process flow to step ZZ);
  2 if the object profile is not limited, directs process flow to step YY);
YY) grants to the requesting user access to the requested object and exits the process;
ZZ) denyies access to the requested object and exits the process.

7. The process of claim 4 in which the security of the data processing system is administered by a security administrator and which further includes steps AA) BB), BB)1), BB)2), CC), CC)1), CC)2), DD), DD)1), DD)2), EE), EE)1), EE)2), FF), FF)1)a), FF)1)b), FF)2), GG), GG)1), GG)2), HH), HH)1)a), HH)1)b), HH)2)a), HH)2)b), XX), YY) and ZZ), carried out prior to the performance of step A), which steps respectively perform the following operations when invoked:
AA) receives a user's request in a user-supplied data format to access a requested object in the data processing system;
BB) determines if the user-supplied data format is valid under the new security system;
  1) if the user-supplied data format is valid under the new security system, directs process flow to step CC);
  2) if the user-supplied data format is not valid under the new security system, directs process flow to step DD);
CC) performs the normal validation process under the new security system;
  1) if the validation process is successful, directs process flow to step YY);
  2) if the normal validation process is unsuccessfuil, directs process flow to step HH);
DD) determines if an object profile exists in the new security system for the requested object;
  1) if an object profile does not exist for the requested object, directs process flow to step CC);
  2) if an object profile exists for the requested object, directs process flow to step EE);
EE) determines if the profile of the requested object is locked;
  1) if the profile of the requested object is locked, directs process flow to step FF);
  2) if the profile of the requested object is not locked, directs process flow to step GG);
FF) determines if the object profile is application controlled;
  1) if the object profile is application controlled:
    a) sends a message to the security administrator identifying the requesting user-supplied token and the fact of denial of access; and
    b) directs process flow to step ZZ);
  2) if the object profile is not application controlled; directs process flow to step CC);
GG) determines if the object profile is application controlled;
  1) if the object profile is application controlled; directs process flow to step XX);
  2) if the object profile is not application controlled; directs process flow to step HH);
HH) determines if an object profile is limited;
  1) if the object profile is limited:
    a) sends a message to the security administrator identifying the requesting user-supplied token and the fact of denial of access; and
    b) directs process flow to step ZZ);
  2) if the object profile is not limited:
    a), collects data supplied by the security administrator for the object profile; and
    b) directs process flow to step YY);
XX) sends a message to the security administrator identifying the requesting user-supplied token and the fact of grant of access to the requested object to the requesting user;
YY) grants to the requesting user access to the requested object and exits the process;
ZZ) denies access to the requested object, notifying the requesting user of that fact and exits the process.

* * * * *